(12) United States Patent
Iwase (10) Patent No.: US 12,445,320 B2
(45) Date of Patent: Oct. 14, 2025

(54) CONTROL APPARATUS, CONFERENCE SYSTEM, AND RECORDING MEDIUM

(71) Applicant: Konica Minolta, Inc., Tokyo (JP)

(72) Inventor: Tomohiro Iwase, Fuchu (JP)

(73) Assignee: Konica Minolta, Inc., Tokyo (JP)

( * ) Notice: Subject to any disclaimer, the term of this patent is extended or adjusted under 35 U.S.C. 154(b) by 311 days.

(21) Appl. No.: 18/344,004

(22) Filed: Jun. 29, 2023

(65) Prior Publication Data

US 2024/0048400 A1 Feb. 8, 2024

(30) Foreign Application Priority Data

Aug. 2, 2022 (JP) ................................. 2022-123033

(51) Int. Cl.
*H04L 12/18* (2006.01)

(52) U.S. Cl.
CPC ...... *H04L 12/1895* (2013.01); *H04L 12/1822* (2013.01)

(58) Field of Classification Search
CPC ............. H04L 12/1895; H04L 12/2807; H04L 12/2809; H04L 12/2828; H04L 12/2814; H04L 12/282
USPC .................................. 709/203, 220, 224–228
See application file for complete search history.

(56) References Cited

U.S. PATENT DOCUMENTS

| | | | | |
|---|---|---|---|---|
| 10,642,249 | B2 * | 5/2020 | Srinivasan | G05B 23/024 |
| 11,003,334 | B1 * | 5/2021 | Conway | G06Q 40/08 |
| 2015/0153243 | A1 * | 6/2015 | Al-Sayed Wahba | G01M 3/00 73/40 |
| 2015/0244985 | A1 * | 8/2015 | Igarashi | H04N 7/147 348/14.08 |
| 2018/0292810 | A1 * | 10/2018 | Gao | B25J 9/0093 |
| 2022/0053164 | A1 * | 2/2022 | Katakura | H04N 7/142 |
| 2022/0218256 | A1 * | 7/2022 | Thiagarajan | A61B 5/14532 |
| 2022/0378377 | A1 * | 12/2022 | Au | G16H 40/63 |
| 2024/0048400 | A1 * | 2/2024 | Iwase | H04L 12/1822 |
| 2024/0151569 | A1 * | 5/2024 | Van Buskirk | G01F 1/666 |

FOREIGN PATENT DOCUMENTS

| | | | | |
|---|---|---|---|---|
| CA | 3028273 C | * | 9/2019 | .......... H04L 43/026 |
| CN | 204287787 U | * | 4/2015 | |
| FR | 3031205 A1 | * | 7/2016 | ......... H04L 12/2818 |
| JP | 2012-034020 | | 2/2012 | |
| JP | 2021-124659 | | 8/2021 | |

* cited by examiner

*Primary Examiner* — Khanh Q Dinh
(74) *Attorney, Agent, or Firm* — BakerHostetler (57) ABSTRACT

A control apparatus includes a hardware processor that obtains information on volume of a sound in a conference room detected by a sound detection device that detects the sound in the conference room during a conference in the conference room, derives an index value that represents risk of information leakage due to sound leakage, based at least on the obtained information on the volume of the sound in the conference room, and causes an output device or an information terminal device installed in the conference room to issue an alert, if the index value is equal to or more than a predetermined threshold.

7 Claims, 4 Drawing Sheets

| RESERVATION ID | CONFERENCE ROOM | DATE AND TIME OF USE | REPRESENTATIVE | PARTICIPANT'S DEPARTMENT | CONFIDENTIALITY | CONFERENCE TYPE | ... |
|---|---|---|---|---|---|---|---|
| 0001 | CONFERENCE ROOM A | 20220110 12:00-13:00 | ○○○○ | SECOND SALES DEPARTMENT | MEDIUM | WEB CONFERENCE | ... |
| 0002 | CONFERENCE ROOM B | 20220111 10:00-11:00 | △△△△ | PRODUCT PLANNING DEPARTMENT | HIGH | TELECONFERENCE | |
| 0003 | CONFERENCE ROOM A | 20220112 10:00-11:00 | ××× | PRODUCT DEVELOPMENT DEPARTMENT | HIGH | FACE-TO-FACE CONFERENCE | |
| ... | | | | ... | ... | ... | |

ENTER CONFERENCE CONFIDENTIALITY

HIGH ▶ — 61a

OK — 61b    CANCEL — 61c

61

CONTROL APPARATUS, CONFERENCE SYSTEM, AND RECORDING MEDIUM

CROSS-REFERENCE TO RELATED APPLICATIONS

This application claims priority to Japanese Patent Application No. 2022-123033 filed on Aug. 2, 2022, the entire disclosure of which is incorporated herein by reference in its entirety.

TECHNICAL FIELD

The present invention relates to a control apparatus, a conference system, and a recording medium.

DESCRIPTION OF THE RELATED ART

When confidential content is spoken about in a conference room, a sound in a conference may leak outside of the conference room, and confidential information may possibly leak out.

To prevent such a situation, for example, JP 2012-034020A describes a technique that notifies conference participants of an alert when a suspicious person is found around the conference room through detection devices, such as a camera and a sensor, installed outside of the conference room.

Furthermore, for example, JP 2021-124659A describes that jamming sound data for preventing a sound in the room from leaking to outside of the room is generated based on room sound data and ambient sound data collected by respective microphones installed inside and outside of the conference room, and is output through a speaker installed outside of the room.

SUMMARY OF THE INVENTION

Unfortunately, according to the technique described in JP 2012-034020A, even in case the sound of participants of the conference is loud, and the sound leaks outside of the conference room, the participants cannot notice the leakage.

According to the technique described in JP 2021-124659A, the jamming sound is output irrespective of the sound volume in the conference room. Accordingly, there is a problem that even if a conference is held with a small sound that does not leak out, the jamming sound is output anyway, and is thus noisy.

The present invention has an object to appropriately prevent a sound in a conference room from leaking out depending on the risk of information leakage due to sound leakage.

To achieve at least one of the abovementioned objects, according to an aspect of the present invention, a control apparatus reflecting one aspect of the present invention includes a hardware processor that obtains information on volume of a sound in a conference room detected by a sound detection device that detects the sound in the conference room during a conference in the conference room, derives an index value that represents risk of information leakage due to sound leakage, based at least on the obtained information on the volume of the sound in the conference room, and causes an output device or an information terminal device installed in the conference room to issue an alert, if the index value is equal to or more than a predetermined threshold.

To achieve at least one of the abovementioned objects, according to an aspect of the present invention, a conference system reflecting one aspect of the present invention includes: a sound detection device that detects a sound in a conference room during a conference in the conference room; an output device or an information terminal device that is installed in the conference room; and a control apparatus having a hardware processor that derives an index value that represents risk of information leakage due to sound leakage, based at least on information on volume of the sound in the conference room detected by the sound detection device, and causes the output device or the information terminal device to issue an alert if the index value is equal to or more than a predetermined threshold.

To achieve at least one of the abovementioned objects, according to an aspect of the present invention, a recording medium reflecting one aspect of the present invention is a non-transitory computer readable recording medium storing a program causing a computer to perform: obtaining information on volume of a sound in a conference room detected by a sound detection device that detects the sound in the conference room during a conference in the conference room; deriving an index value that represents risk of information leakage due to sound leakage, based at least on the obtained information on the volume of the sound in the conference room; and causing an output device or an information terminal device installed in the conference room to issue an alert, if the index value is equal to or more than a predetermined threshold.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, one or more embodiments of the present invention will be described with reference to the drawings. However, the scope of the invention is not limited to the disclosed embodiments.

First, a conference system 100 according to this embodiment is described.

Figure 1:
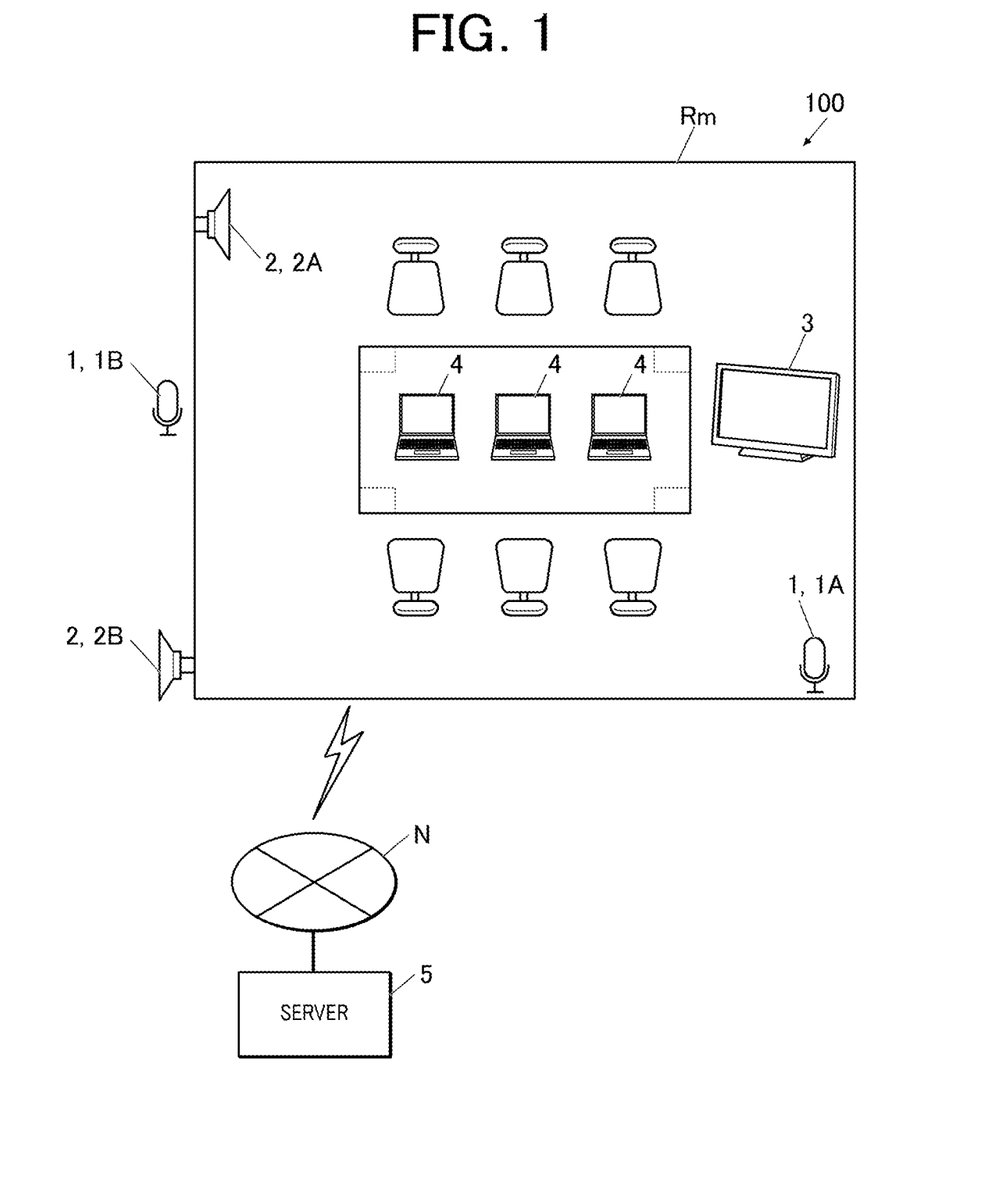
FIG. 1 shows an overall configuration example of a conference system according to this embodiment.

FIG. 1 shows an overall configuration example of the conference system 100. As shown in FIG. 1, the conference system 100 includes sound detection devices 1 (1A and 1B), sound output devices 2 (2A and 2B), a monitor 3, information terminal devices 4, and a server 5. The server 5 is connected, via a communication network N, such as a LAN (Local Area Network) or a WAN (Wide Area Network), to the sound detection devices 1, the sound output devices 2, the monitor 3, and the information terminal devices 4, which are installed inside or outside of a conference room Rm.

Here, the conference room Rm generally indicates a space where a conference is held, and also includes an open-space meeting zone or the like.

The sound detection devices 1 are made up of microphones, for example. In this embodiment, the conference system 100 includes: the sound detection device 1 (1A) that detects a sound in the conference room Rm, and outputs (transmits) the sound to the server 5; and the sound detection device 1 (1B) that detects a sound outside of the conference room Rm, and outputs the sound to the server 5. The sound detection device 1A may be installed either inside or outside of the conference room Rm only if this device has a high directionality, and can detect the sound in the conference room Rm. The sound detection device 1B may be installed either inside or outside of the conference room Rm only if this device has a high directionality, and can detect the sound outside of the conference room Rm (around the conference room Rm).

The sound output devices 2 are made up of speakers, for example. In this embodiment, the conference system 100 includes: the sound output device 2 (2A) that is installed in the conference room Rm, serves as an output device, and outputs a sound (alert) toward the inside of the conference room Rm in accordance with control by the server 5; and the sound output device 2 (2B) that is installed outside of the conference room Rm, and outputs a sound toward the outside of the conference room Rm.

The monitor 3 is, for example, made up of an LCD (Liquid Crystal Display), and is installed in the conference room Rm. The monitor 3 serves as an output device, and outputs an alert character string or an alert image in accordance with control by the server 5.

The information terminal devices 4 are terminal devices that participants of a conference use for a web (World Wide Web) conference or a teleconference. The information terminal devices 4 may be, for example, PCs (Personal Computers), tablet terminals, etc. The information terminal devices 4 are placed in the conference room Rm at least during a conference, and display an alert character string or an alert image and output an alert sound in accordance with control by the server 5.

The server 5 calculates an index value that indicates the risk of information leakage due to sound leakage, based on information on the volume and the like of a sound detected by each sound detection device 1, and causes the sound output devices 2, the monitor 3, or the information terminal devices 4 to issue an alert, causes the sound output devices 2 to output a sound at a volume louder than that in the conference room Rm, or causes the information terminal devices 4 to forcibly terminate the conference, based on the calculated index value. That is, the server 5 functions as a control apparatus of the present invention.

The server 5 is connected to an external terminal, not shown, via the communication network N, accepts a reservation for a conference room from the external terminal, and manages conference reservation information.

Figure 2:
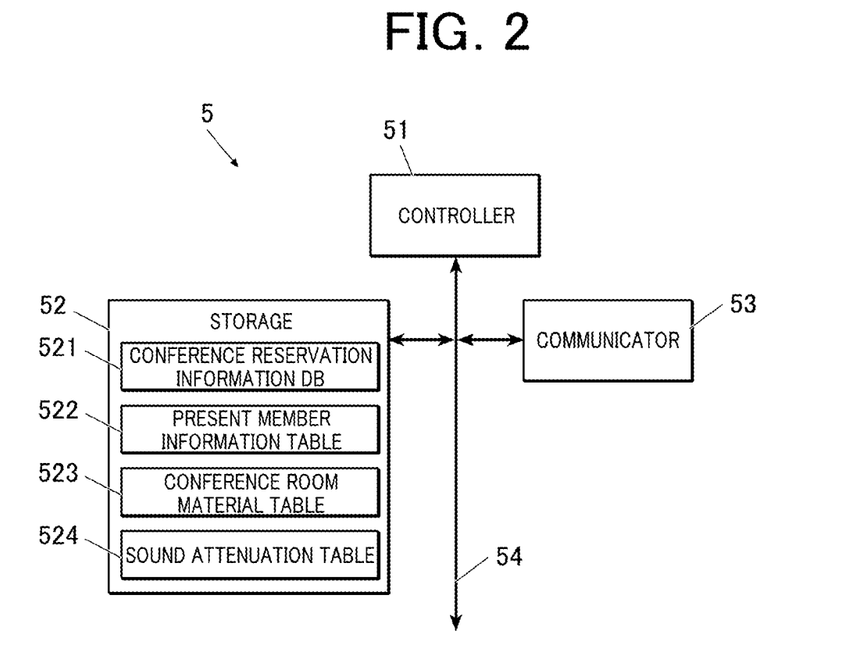
FIG. 2 is a block diagram showing a functional configuration of a server in FIG. 1.

FIG. 2 is a block diagram showing the functional configuration of the server 5. As shown in FIG. 2, the server 5 includes a controller 51 (hardware processor), a storage 52, and a communicator 53. The controller 51, the storage 52, and the communicator 53 are connected to each other via a bus 54.

The controller 51 includes a CPU (Central Processing Unit), a RAM (Random Access Memory) and the like, and controls each component of the server 5. Specifically, the CPU of the controller 51 reads designated programs among system programs, and various processing programs stored in the storage 52, loads the programs into the RAM, and executes various processes including a sound leakage prevention process, described later, through cooperation with the loaded programs. The controller 51 executes the sound leakage prevention process, thus achieving functions as those of a first obtainer, an index value deriver, a control device, and a second obtainer. The functions of the first obtainer and the second obtainer are achieved by cooperation between the controller 51 and the communicator 53.

The storage 52 is made up of a non-volatile semiconductor memory, an HDD (Hard Disk Drive), etc. The storage 52 stores the system programs of the server 5, programs for executing various processes including the sound leakage prevention process, described later, and data required to execute the programs.

In this embodiment, the storage 52 stores a conference reservation information DB (Data Base) 521, a present member information table 522, a conference room material table 523, and a sound attenuation table 524.

The conference reservation information DB 521 stores the conference reservation information input from the external terminal.

Figure 3:
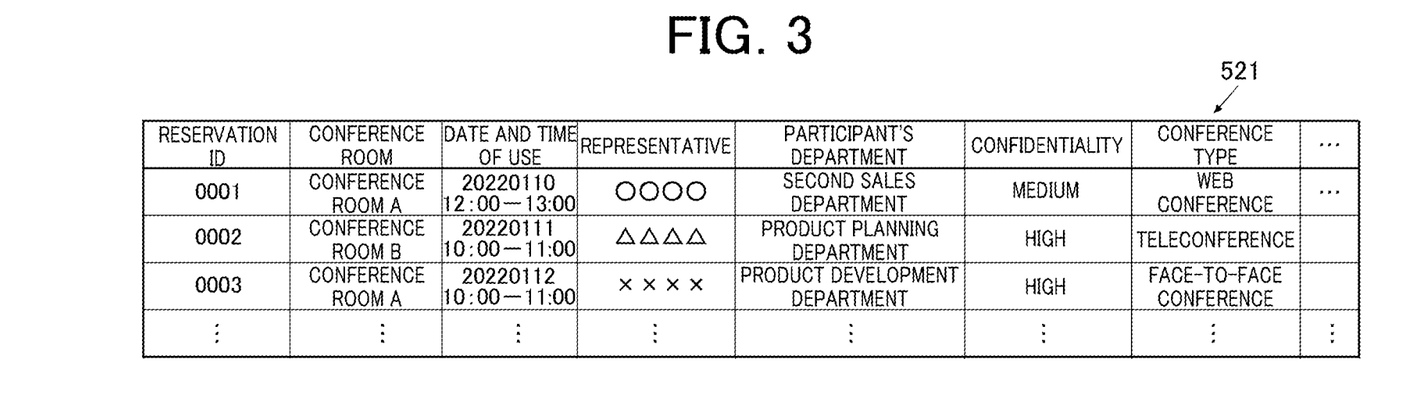
FIG. 3 shows a data storage example in a conference reservation information DB.

FIG. 3 shows a data storage example in the conference reservation information DB 521. As shown in FIG. 3, the conference reservation information DB 521 includes items of reservation IDs, conference rooms (conference room identification information), dates and times of use, representatives, participants' departments, confidentiality of conferences, conference types and the like, and stores conference reservation information that includes these items input from a reservation screen of the external terminal.

The present member information table 522 stores conference room identification information, and attribute information on people (present members) having desks around the conference room (called present member information), in association with each other. The present member information is, for example, information on companies and departments to which the present members belong.

The conference room material table 523 stores the conference room identification information, and information on the materials of walls of the corresponding conference rooms, in association with each other.

The sound attenuation table 524 stores the information on materials of walls, and attenuations of sounds by which sounds are attenuated by the walls with the corresponding materials, in association with each other.

The communicator 53 transmits and receives data to and from each device in the conference system 100, and the external terminal, via the communication network N, such as a LAN or a WAN.

Next, an operation of the conference system 100 is described.

When the communicator 53 receives a request for display of a reservation screen issued by the external terminal, the controller 51 of the server 5 transmits the reservation screen, not shown, for making a reservation for a conference room to the external terminal, and causes the external terminal to display the screen.

Figure 4:
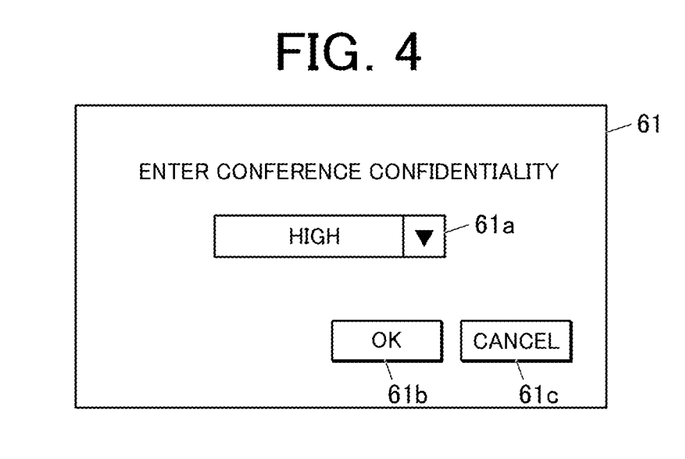
FIG. 4 shows an example of a confidentiality input screen.

Here, the reservation screen includes a screen for inputting a conference room name, a date and time of use, a representative, participants' department, a conference type (a face-to-face conference, a web conference, or a teleconference) and the like, and further includes a confidentiality input screen 61 for inputting the confidentiality of a conference.

FIG. 4 shows an example of the confidentiality input screen 61 for inputting the confidentiality of a conference.

As shown in FIG. 4, on the confidentiality input screen 61 there are arranged a selection field 61a for selecting the confidentiality of a conference from among high, medium, and low, an OK button 61b, and a cancel button 61c. When a user selects the confidentiality of a conference to be reserved, from the selection field 61a on the confidentiality input screen 61, and presses the OK button 61b, thus setting information indicating the confidentiality of the conference in the conference reservation information.

Note that the information indicating the confidentiality of the conference is not limited to high, medium or low. For example, a scheme of allowing a numerical value varying from 0 to 100 to be input may be adopted.

When the external terminal receives required information from the reservation screen, and receives an instruction to transmit the conference reservation information, the external terminal transmits the conference reservation information to the server 5.

When the server 5 receives the conference reservation information from the external terminal through the communicator 53, the controller 51 stores the received conference reservation information in the conference reservation information DB 521.

Figure 5:
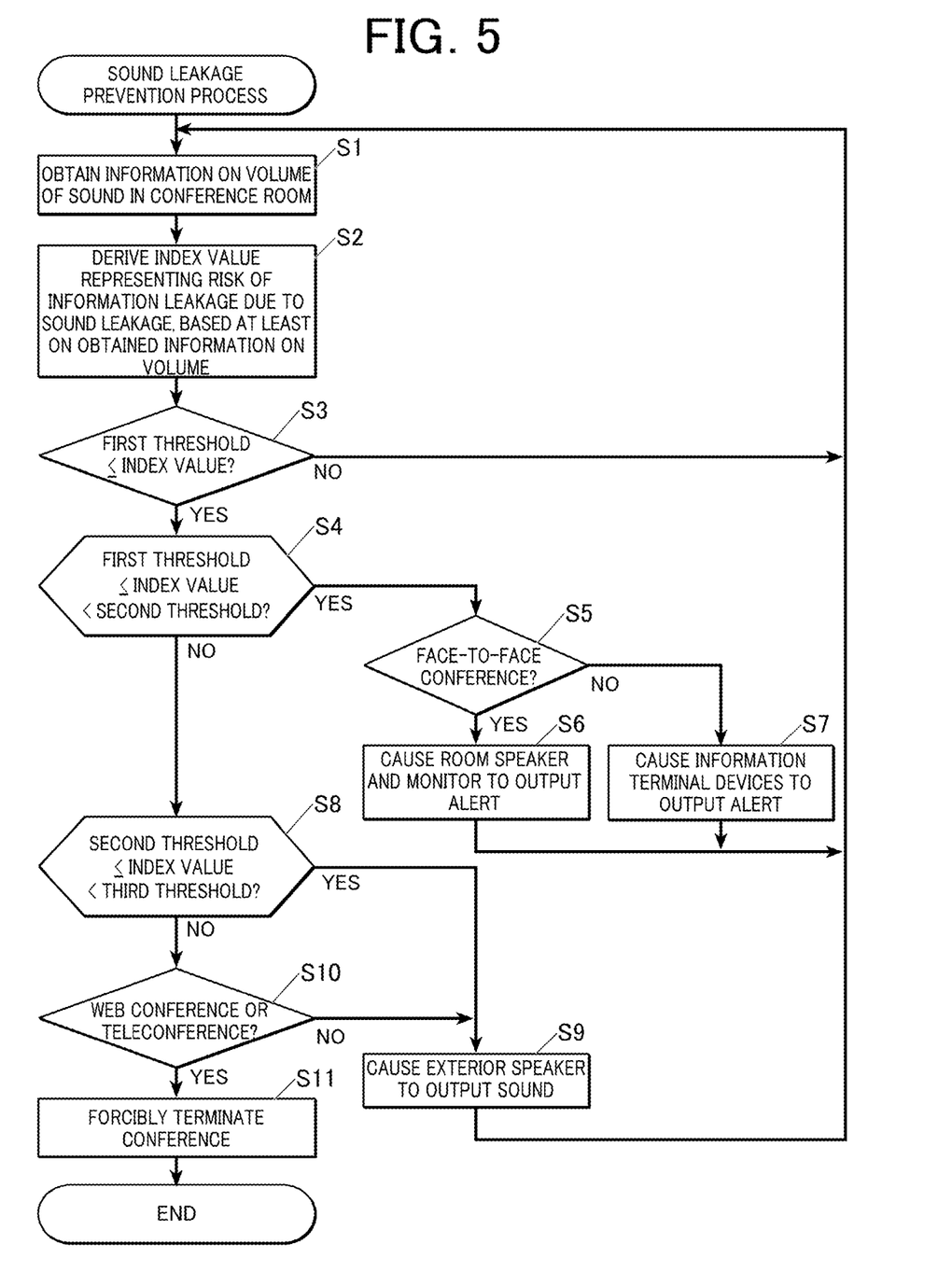
FIG. 5 is a flowchart showing a flow of a sound leakage prevention process executed by a controller in FIG. 2.

When the date and time of use included in the conference reservation information stored in the conference reservation information DB 521 is reached, the controller 51 of the server 5 executes the sound leakage prevention process.

FIG. 5 is a flowchart showing the flow of the sound leakage prevention process. The sound leakage prevention process is executed by cooperation between the CPU of the controller 51 and the programs stored in the storage 52.

Note that in the sound leakage prevention process, a first threshold, a second threshold, and a third threshold are predefined. The magnitude relationship between these thresholds is the first threshold<the second threshold<the third threshold.

In the sound leakage prevention process, first, the controller 51 causes the sound detection device 1A to detect a sound in the conference room Rm, and obtains information on the volume of the sound in the conference room Rm (Step S1).

Next, the controller 51 derives the index value that represents the risk of information leakage due to sound leakage, based at least on the information on the volume of the sound in the conference room Rm obtained in Step S1 (Step S2).

In this embodiment, the index value that represents the risk of information leakage due to sound leakage has a higher value as the risk of information leakage due to sound leakage is higher.

The higher the volume of the sound in the conference room Rm is, the higher the risk of information leakage due to sound leakage is. Accordingly, for example, the controller 51 derives the index value that represents the risk of information leakage due to sound leakage, based on the obtained value of the volume of the sound in the conference room Rm. For example, the controller 51 derives the obtained value itself of the volume in the conference room Rm, as the index value. Alternatively, the controller 51 may derive the index value that represents the risk of information leakage due to sound leakage by converting the value of the volume into the index value in conformity with a predefined reference so that for example, the index value is 0 if the obtained value of the volume is less than a first value, the index value is 50 if the obtained value is equal to or more than the first value and less than a second value, and the index value is 100 if the obtained value is equal to or more than the second value (first value<second value).

Furthermore, the controller 51 may obtain at least one or more of pieces of information described below, and derive the index value that represents the risk of information leakage due to sound leakage, based on the information on the volume of the sound in the conference room Rm obtained in Step S1 and on at least one or more of the following pieces of information obtained: information indicating the confidentiality of the conference; information on the volume around the conference room Rm; information on present members around the conference room Rm; and information on the sound insulation of the conference room Rm (the attenuation of the sound due to the walls of the conference room Rm).

The higher the confidentiality of the conference is, the higher the risk of information leakage due to sound leakage is. The lower the confidentiality of the conference is, the lower the risk of information leakage due to sound leakage is. Accordingly, on the basis of the information indicating the confidentiality of the conference, for example, the controller 51 derives a coefficient for adjusting the index value derived based on the volume of the sound in the conference room Rm. For example, the controller 51 derives a coefficient (a coefficient less than 1, e.g., 0.5) for reducing the index value if the information indicating the confidentiality of the conference is "low", and this controller derives a coefficient (a coefficient more than 1, e.g., 1.5) for increasing the index value if the information indicating the confidentiality of the conference is "high". For example, the index value derived based on the volume of the sound in the conference room Rm is multiplied by the derived coefficient.

Note that the information indicating the confidentiality of the conference can be, for example, obtained by reading the information in the item of "confidentiality" in the conference reservation information about a currently held conference in the conference reservation information DB 521.

If the volume around the conference room Rm is loud, it is conceivable that the possibility of eavesdropping on the content is low even with sound leakage from the conference room Rm. That is, the higher the volume of the sound around the conference room Rm is, the lower the risk of information leakage due to sound leakage is. Accordingly, for example, the controller 51 obtains information on the volume of the sound around the conference room Rm detected by the sound detection device 1B, and derives a coefficient for adjusting the index value derived based on the volume of the sound in the conference room Rm, on the basis of the obtained information on the volume of the sound around the conference room Rm. For example, if the volume around the conference room Rm is more than a predefined threshold, the controller 51 derives a coefficient (a coefficient less than 1, e.g., 0.2) for reducing the index value. The controller 51 multiplies the index value derived based on the volume of the sound in the conference room Rm, for example, by the derived coefficient.

If a person belonging to a company or a department different from that of the participants of the conference is present around the conference room Rm, the risk of information leakage due to sound leakage is high. Conversely, if a present member around the conference room Rm belongs to the department identical to that of the participants of the conference, the risk of information leakage due to sound leakage is low. Accordingly, the controller 51, for example, derives the coefficient for adjusting the index value derived based on the volume of the sound in the conference room Rm, on the basis of the present member information, which is attribute information on people present around the conference room Rm (present members), and of the departments to which the conference participants belong. For example, if the department of the participants of the conference is identical to that of the present member around the conference room Rm, the risk of information leakage is low. Accordingly, the controller 51 derives a coefficient (a coefficient less than 1, e.g., 0.8) for reducing the index value. If the department of the participants of the conference is different from that of the present member around the conference room Rm, the risk of information leakage is high. Accordingly, a coefficient (a coefficient more than 1, e.g., 1.5) for increasing the index value is derived. The controller 51 multiplies the index value derived based on the volume of the sound in the conference room Rm, for example, by the derived coefficient.

Note that, for example, the information on the present member around the conference room Rm can be obtained by identifying the conference room Rm where a conference is currently being held from the conference reservation information DB 521, and reading the information on the present member around the identified conference room Rm from the present member information table 522. The department of the participants of the conference can be obtained, for example, by reading the information in the item of "participant's department" in the conference reservation information about the currently held conference in the conference reservation information DB 521.

With a high sound insulation of the conference room Rm, the sound does not leak to the outside so much as assumed even if the volume of the sound in the conference room Rm is loud. That is, the higher the sound insulation of the conference room Rm is, the lower the risk of information leakage due to sound leakage is. Accordingly, on the basis of information on the sound insulation of the conference room Rm, for example, the controller 51 derives a coefficient for adjusting the index value derived based on the volume of the sound in the conference room Rm. For example, if the information on the sound insulation of the conference room Rm (sound attenuation by the walls of the conference room Rm) is more than a predefined threshold, the controller 51 derives a coefficient (a coefficient less than 1, e.g., 0.8) for reducing the index value. The controller 51 multiplies the index value derived based on the volume of the sound in the conference room Rm, for example, by the derived coefficient.

Note that, for example, the information on the sound insulation of the conference room Rm (sound attenuation by the walls of the conference room Rm) can be obtained by identifying a conference room Rm where a conference is currently being held from the conference reservation information DB 521, identifying the material of the walls of the identified conference room Rm with reference to the conference room material table 523, and identifying the sound attenuation due to the walls of the identified material on the basis of the sound attenuation table 524.

Next, the controller 51 determines whether or not the derived index value is equal to or more than the first threshold (Step S3).

If it is not determined that the derived index value is equal to or more than the first threshold (Step S3: NO), the controller 51 returns the processing to Step S1.

If it is determined that the derived index value is equal to or more than the first threshold (Step S3: YES), the controller 51 then determines whether or not the derived index value is equal to or more than the first threshold and less than the second threshold (Step S4).

If it is determined that the derived index value is equal to or more than the first threshold and less than the second threshold (Step S4: YES), the controller 51 then determines whether or not the type of the currently held conference is a face-to-face conference (Step S5).

If it is determined that the type of the currently held conference is a face-to-face conference (Step S5: YES), the controller 51 causes the sound output device 2A (room speaker) or the monitor 3 to issue an alert (Step S6), and returns the processing to Step S1.

For example, the controller 51 causes the sound output device 2A to output an alert sound for an alert for reducing the sound against the risk of information leakage. Alternatively, the controller 51 causes the monitor 3 to output an alert character string or an alert image for an alert for reducing the sound against the risk of information leakage. All the alert sound, the alert character string, and the alert image may be output.

If it is determined that the type of the currently held conference is not a face-to-face conference (i.e., a web conference or a teleconference) (Step S5: NO), the controller 51 causes the information terminal devices 4 used for the conference to output the alert character string, the alert image, or the alert sound (Step S7), and returns the processing to Step S1. All the alert sound, the alert character string, and the alert image may be output.

On the other hand, if it is not determined that the derived index value is equal to or more than the first threshold and less than the second threshold in Step S4 (Step S4: NO), the controller 51 then determines whether or not the derived index value is equal to or more than the second threshold and less than the third threshold (Step S8).

If it is determined that the derived index value is equal to or more than the second threshold and less than the third threshold (Step S8: YES), the controller 51 causes the sound output device 2B (exterior speaker) to output a sound at a louder volume than the volume of the sound in the conference room Rm (Step S9), and returns the processing to Step S1.

Here, if the derived index value is equal to or more than the second threshold, a state with a significantly high risk of information leakage due to sound leakage is conceivable. Accordingly, in Step S9, the sound is output from the sound output device 2B installed outside of the conference room Rm at a louder volume than the volume of the sound in the conference room Rm, thus preventing the sound in the conference room Rm from being eavesdropped outside.

If it is determined that the derived index value is not equal to or more than the second threshold and less than the third threshold (i.e., equal to or more than the third threshold) (Step S8: NO), the controller 51 then determines whether or not the type of the currently held conference is a web conference or a teleconference (Step S10).

If it is not determined that the type of the currently held conference is a web conference or a teleconference (i.e., a face-to-face conference) (Step S10: NO), the controller 51 causes the sound output device 2B to output a sound at a louder volume than the volume of the sound in the conference room Rm (Step S9), and returns the processing to Step S1.

If it is determined that the type of the currently held conference is a web conference or a teleconference (Step S10: YES), the controller 51 causes the information terminal devices 4 to forcibly terminate the conference (Step S11), and finishes the sound leakage prevention process.

If the conference type is a web conference or a teleconference in the state where the risk of information leakage due to sound leakage is significantly high, the forcible termination of the conference can prevent the sound from further leaking to the outside of the conference room Rm.

After the conference in the conference room Rm is finished, the controller 51 finishes the sound leakage prevention process.

For example, if the finish time of the currently held conference is reached, and no sound is input from the sound detection device 1A for a predetermined time period, the controller 51 determines that the conference has been finished, and finishes the sound leakage prevention process.

As described above, the controller 51 of the server 5 obtains the information on the volume of the sound in the conference room Rm detected by the sound detection device 1A that detects the sound in the conference room Rm during the conference in the conference room Rm, and derives the index value that represents the risk of information leakage due to sound leakage, based at least on the information on the volume of the sound in the conference room Rm. If the derived index value is equal to or more than the predetermined threshold, the controller 51 causes the output device (the sound output device 2A, and the monitor 3) or the information terminal devices 4 installed in the conference room Rm to issue an alert.

Consequently, if the risk of information leakage due to leakage of the sound of the conference is equal to or more than the predetermined threshold, the participants of the conference can be prompted to reduce the sound, which can appropriately prevent information leakage due to leakage of the sound in the conference room to the outside.

Furthermore, the controller 51 obtains information that is at least one or more pieces of information among information indicating the confidentiality of the conference held in the conference room Rm, information on the volume of the sound around the conference room Rm, attribute information on present member around the conference room Rm, or information on the sound insulation of the conference room Rm. The index value that represents the risk of information leakage due to sound leakage is derived, based on the information on the volume of the sound in the conference room Rm, and at least one or more pieces of information among the information indicating the confidentiality of the conference, the information on the volume of the sound around the conference room Rm, the attribute information on the present member around the conference room Rm, or the information on the sound insulation of the conference room Rm.

Consequently, by considering not only the volume of the sound in the conference room, but also the confidentiality of the conference, the situations around the conference room, the sound insulation of the conference room and the like, the index value that represents the risk of information leakage due to sound leakage can be more accurately derived.

If the conference in the conference room Rm is a face-to-face conference, the controller 51 causes the output devices (the sound output device 2A, and the monitor 3) installed in the conference room Rm to output the alert character string, the alert image, or the alert sound.

Consequently, an alert for reducing the sound can be achieved in a mode allowing the participants of the face-to-face conference to notice.

If the conference in the conference room Rm is a web conference or a teleconference, the controller 51 causes the information terminal devices 4 used for the conference to output the alert character string, the alert image, or the alert sound.

Consequently, an alert for reducing the sound can be achieved in a mode allowing the participants of the web conference or the teleconference to notice.

If the derived index value is equal to or more than the predetermined threshold that is more than the predetermined threshold, the controller 51 causes the sound output device installed outside of the conference room Rm to output a sound at a volume louder than the volume of the sound in the conference room Rm.

Consequently, if the risk of information leakage due to sound leakage is significantly high, the sound output from the sound output device 2B installed outside of the conference room Rm at the volume louder than the volume of the sound in the conference room Rm can securely prevent the sound in the conference room Rm from leaking to the outside.

If the derived index value is equal to or more than the predetermined threshold that is more than the predetermined threshold, and the conference in the conference room Rm is a web conference or a teleconference, the controller 51 forcibly terminates the web conference or the teleconference.

Consequently, if the conference is the web conference or the teleconference, and the risk of information leakage due to sound leakage is significantly high, the conference is forcibly terminated, which can securely prevent the sound in the conference room Rm from further leaking to the outside.

Note that the description in the embodiment described above is a preferable example of the conference system according to the present invention. There is no limitation to this.

For example, in the embodiment described above, the controller 51 thus obtains the information indicating the confidentiality of the conference, from the conference reservation information input by the user during conference room reservation. However, there is no limitation to this. For example, the controller 51 may analyze the sound during the conference obtained from the sound detection device 1A, determine the confidentiality of the conference, based on whether or not predefined highly confidential words are included, and obtain the determination result as information indicating the confidentiality of the conference.

In the embodiment described above, based on the information indicating the confidentiality of the conference or the like, the coefficient for adjusting the derived index value is derived based on the volume of the sound in the conference room Rm, and the index value is multiplied by the derived coefficient, thus deriving the index value that represents the risk of information leakage due to sound leakage. However, the coefficient derived based on the information indicating the confidentiality of the conference and the like, and the method of adjusting the index value are only examples, and there is no limitation to these examples. For example, based on the information indicating the confidentiality of the conference and the like, a correction value for adjusting the index value derived based on the volume of the sound in the conference room Rm by addition or subtraction may be derived, and the index value that represents the risk of information leakage due to sound leakage may be derived by adding or subtracting the correction value to or from the index value derived based on the volume of the sound in the conference room Rm.

In the embodiment described above, if the index value that represents the risk of information leakage due to sound leakage is equal to or more than the second threshold, no alert is issued, and sound output to the outside of the conference room Rm, and the web conference or the teleconference are thus forcibly terminated. Alternatively, even in case the index value is equal to or more than the second threshold, an alert may be issued.

In the embodiment described above, for example, the example is disclosed where the hard disk, the semiconductor non-volatile memory or the like is used as a computer-readable medium for the program according to the present invention. However, there is no limitation to this example. As another computer-readable medium, a portable recording medium, such as a CD-ROM, may be applied. Carrier waves are also applicable as a medium of providing data of the program according to the present invention via a communication line.

Furthermore, detailed operations of the devices that constitute the conference system can be changed as appropriate within a range not deviating from the spirit of the present invention.

Although embodiments of the present invention have been described and illustrated in detail, the disclosed embodiments are made for purposes of illustration and example only and not limitation. The scope of the present invention should be interpreted by terms of the appended claims.

The invention claimed is:

1. A control apparatus, comprising a hardware processor that obtains information on volume of an internal sound in a conference room detected by a sound detection device that detects the internal sound in the conference room during a conference in the conference room,
   derives an index value that represents risk of information leakage due to sound leakage, the index value derivation being based at least on the obtained information on the volume of the internal sound in the conference room, and
   causes an output device or an information terminal device installed in the conference room to issue an alert, if the index value is equal to or more than a value of a predetermined threshold;
   wherein the hardware processor obtains information that is at least one or more pieces of information among (a) information indicating confidentiality of the conference held in the conference room, (b) information on volume of a sound around the conference room, (c) attribute information on a present member around the conference room, or (d) information on sound insulation of the conference room, and
   the hardware processor further derives the index value based on the at least one or more pieces of information obtained.

2. The control apparatus according to claim 1, wherein if the index value is equal to or more than the value of the predetermined threshold, and the conference in the conference room is a face-to-face conference, the hardware processor causes the output device installed in the conference room to output an alert character string, an alert image, or an alert sound.

3. The control apparatus according to claim 1, wherein if the index value is equal to or more than the value of the predetermined threshold, and the conference in the conference room is a web conference or a teleconference, the hardware processor causes the information terminal device used for the conference to output an alert character string, an alert image, or an alert sound.

4. The control apparatus according to claim 1, wherein if the index value is equal to or more than the value of the predetermined threshold, the hardware processor causes a sound output device installed outside of the conference room to output a sound at a volume louder than the volume of the internal sound in the conference room.

5. The control apparatus according to claim 1, wherein if the index value is equal to or more than the value of the predetermined threshold, and the conference in the conference room is a web conference or a teleconference, the hardware processor forcibly terminates the web conference or the teleconference.

6. A conference system, comprising:
   a sound detection device that detects an internal sound volume in a conference room during a conference in the conference room;
   an output device or an information terminal device that is installed in the conference room; and
   a control apparatus having a hardware processor that derives an index value that represents risk of information leakage due to sound leakage, based at least on first information pertaining to the internal sound volume detected by the sound detection device, and causes the output device or the information terminal device to issue an alert if the index value is equal to or more than a predetermined threshold value;
   wherein the hardware processor obtains second information that is at least one or more pieces of additional information among (a) information indicating confidentiality of the conference held in the conference room, (b) information on volume of a sound around the conference room, (c) attribute information on a present member around the conference room, or (d) information on sound insulation of the conference room, and
   the hardware processor further derives the index value based on the obtained second information.

7. A non-transitory computer readable recording medium storing a program causing a computer to perform:
   obtaining first information on volume of internal sound in a conference room detected by a sound detection device that detects the internal sound in the conference room during a conference in the conference room;
   obtaining second information that is at least one or more pieces of additional information among (a) information indicating confidentiality of the conference held in the conference room, (b) information on volume of a sound around the conference room, (c) attribute information on a present member around the conference room, or (d) information on sound insulation of the conference room;
   deriving an index value that represents risk of information leakage due to sound leakage, based at least on the obtained first information on the volume of the internal sound in the conference room and the obtained second information; and
   causing an output device or an information terminal device installed in the conference room to issue an alert, if the index value is equal to or more than a predetermined threshold value.

* * * * *